Aug. 30, 1966 G. R. LEFEVRE 3,269,785
FLANGED BEARING
Original Filed Oct. 29, 1962 2 Sheets-Sheet 1
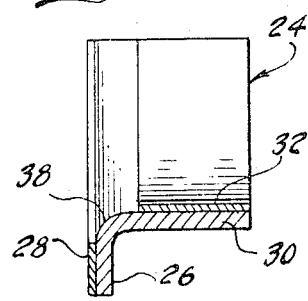
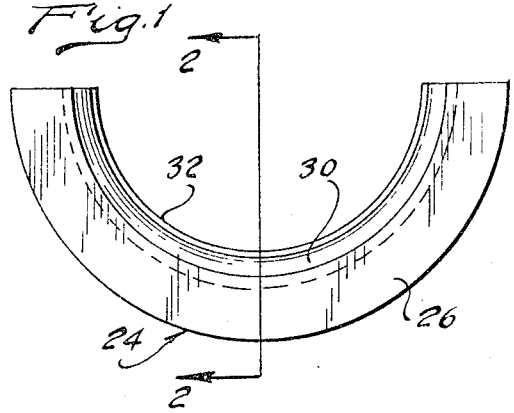
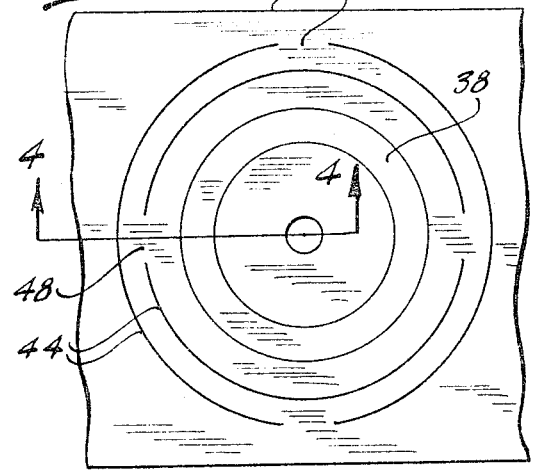
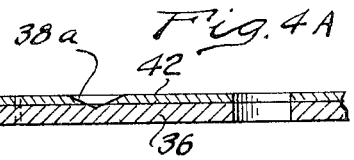
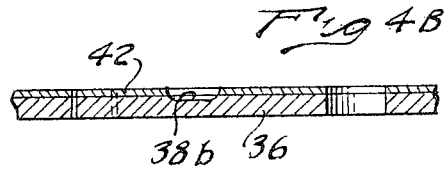
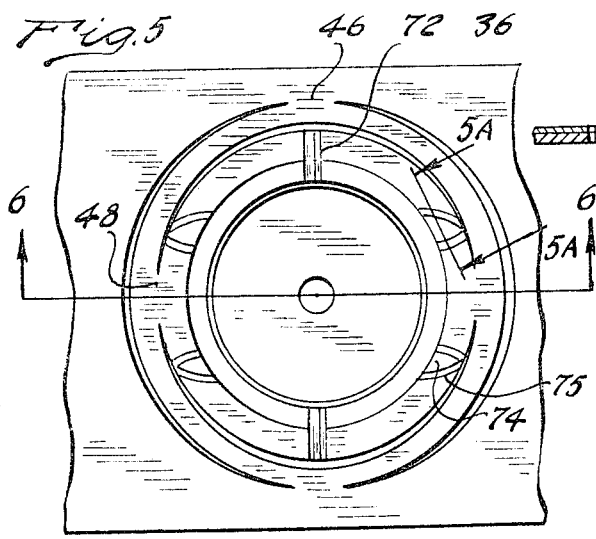
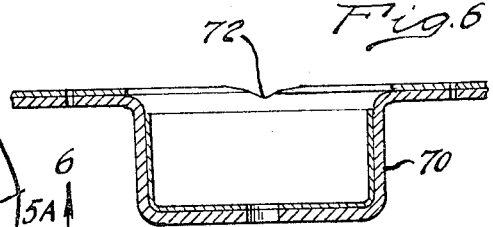
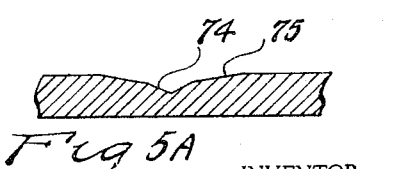
INVENTOR.
GEORGE R. LEFEVRE
BY
Whittemore, Hulbert
& Belknap ATTORNEYS.

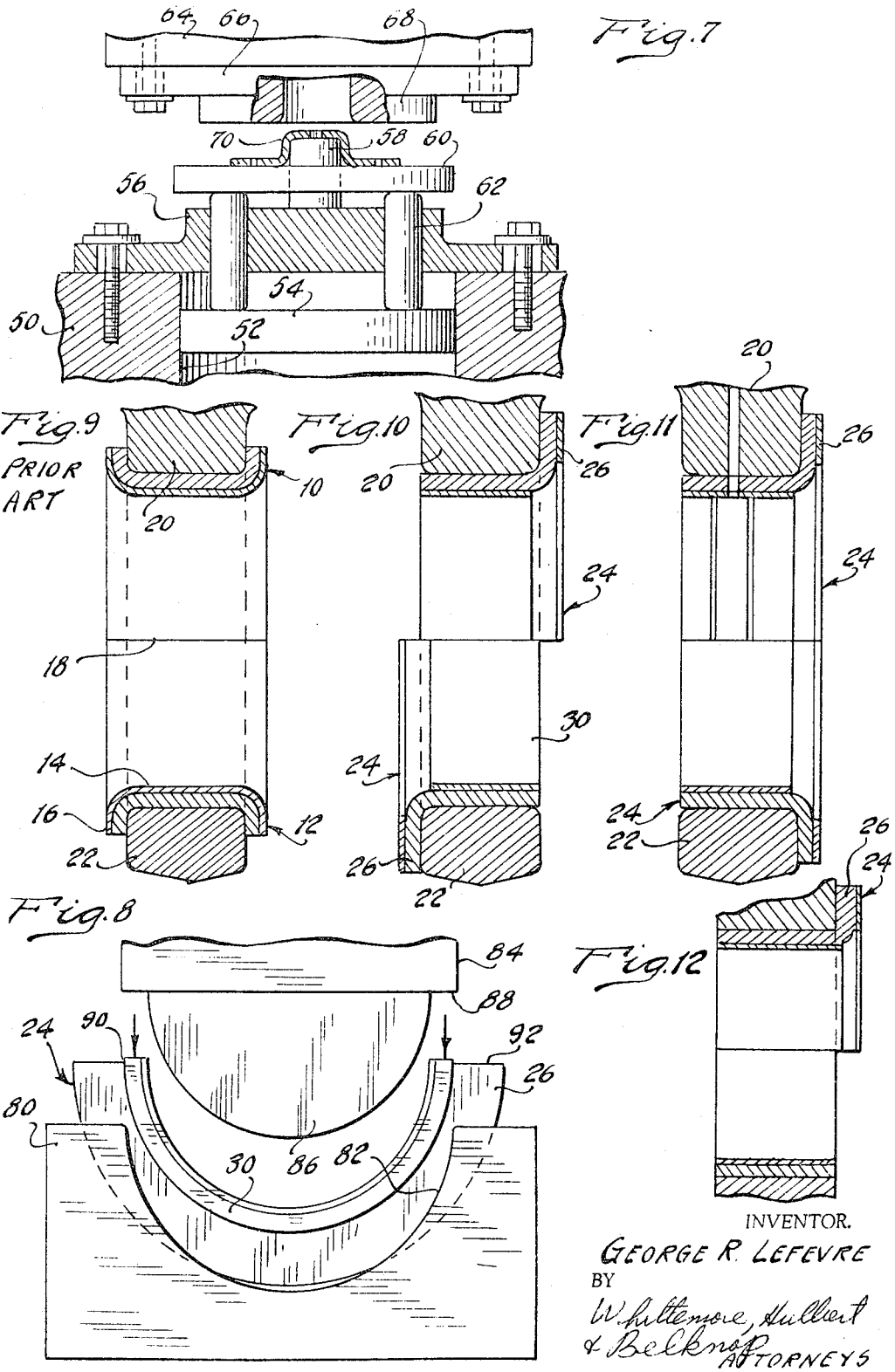

United States Patent Office 3,269,785
Patented August 30, 1966

3,269,785
FLANGED BEARING
George R. Lefevre, Birmingham, Mich., assignor to Universal American Corporation, New York, N.Y., a corporation of New York
Original application Oct. 29, 1962, Ser. No. 233,546. Divided and this application Nov. 10, 1964, Ser. No. 410,206
1 Claim. (Cl. 308—36)

The present invention relates to a flanged bearing and is a division of my copending application entitled, "The Method of Making a Flanged Bearing," Serial No. 233,546, filed October 29, 1962.

It is an object of the present invention to provide a flanged bearing characterized in a relatively great flange area.

It is a further object of the present invention to provide a flanged bearing including a flat radial annular flange forming a thrust bearing characterized in that the metal of the flange is under internal circumferential compression.

It is a further object of the present invention to provide a combined sleeve and thrust bearing including a cylindrically formed sleeve portion and a flat radially extending flange portion forming a thrust bearing at one end only of the cylindrically formed sleeve portion.

It is a further object of the present invention to provide a combined journal and thrust bearing comprising a segmental cylindrical sleeve portion having at one end only thereof a flat radially extending flange portion.

It is a further object of the present invention to provide a bearing assembly comprising a pair of substantially semi-cylindrical journal bearing portions adapted together to form a journal bearing, one of said journal bearing portions having at one end only thereof a flat radially extending flange portion constituting a segmental thrust bearing, the other of said journal bearing portions having at the one end thereof remote from said flange portion a flat radially extending flange portion constituting a segmental thrust bearing facing in the opposite direction from the other thrust bearing.

Other objects and features of the invention will become apparent as the description proceeds, especially when taken in conjunction with the accompanying drawings, illustrating preferred embodiments of the invention, wherein:

FIGURE 1 is an end view of a flanged bearing constructed in accordance with the present invention.

FIGURE 2 is a section on the line 2—2, FIGURE 1.

FIGURE 3 is a fragmentary plan view of strip material from which the flanged bearings are formed.

FIGURE 4A is a fragmentary section on the line 4—4, FIGURE 3, showing one form of flange-to-body undercut.

FIGURE 4B is a view similar to FIGURE 4A illustrating a somewhat different form of flange-to-body undercut.

FIGURE 5 is a plan view of a flanged cup as produced by a drawing and cutting operation performed on the strip material of FIGURE 3.

FIGURE 5A is an enlarged section on the line 5A—5A, FIGURE 5.

FIGURE 6 is a sectional view on the line 6—6, FIGURE 5.

FIGURE 7 is a schematic view illustrating the apparatus used in performing the draw operation.

FIGURE 8 is a schematic view illustrating the apparatus employed in performing the edge coining operation.

FIGURE 9 is a simplified sectional view illustrating the combined journal and thrust bearings as employed in the prior art.

FIGURE 10 is a view similar to FIGURE 9 illustrating one mode of employing the segmental flanged bearings of the present invention.

FIGURE 11 is a view similar to FIGURE 10 illustrating yet another mode of employing the flanged bearings of the present invention.

FIGURE 12 is a view similar to FIGURE 10 illustrating yet another mode of employing the flanged bearing of the present invention.

Referring first to FIGURE 9 there is illustrated a combined journal and thrust bearing assembly as known to the prior art. In this figure the bearing assembly comprises two 180° segmental bearings 10 and 12 each of which includes a cylindrical intermediate portion 14 and a radially extending flange or thrust bearing portion 16.

In order that bearings of this type shall fit properly in the mounting structure indicated generally as comprising a recessed base 20 and removable cap 22, the dimensions between confronting surfaces of the flanges 16 must be maintained with great accuracy and in practice, this dimension is determined by a GO or NO-GO bar gauge and the dimension is frequently required to be held to .002".

Bearings of this type are conventionally made from strip stock which is formed into an elongated straight channel with the side walls thereof either parallel or diverging outwardly from the intermediate portion of the strip. Thereafter, the strip is bent into semi-cylindrical or partially cylindrical configuration. If the flange portions at this time extend obliquely outwardly, they are thereafter shaped to extend radially of the cylindrically formed intermediate portion. A serious drawback and limitation to this method of producing flanged bearings is that the area of the flange is severely limited. It will be apparent that the formation of the channel strip into arcuate configuration results in tension being applied, concentrated at the outer edges of the flanges. If these flanges are of substantial size, the material splits, thins, or is subjected to flow under tension sufficient to cause cracking or damage to bearing material carried thereon.

In accordance with the present invention flanged bearings of the type illustrated in FIGURES 1 and 2, indicated at 24, are provided characterized in the capability of having flanges 26 of any useful size without thinning or cracking or injury to bearing material 28 carried thereon. The particular method of producing these bearings is such that the metal of the radial flange portion 26 thereof is actually under internal circumferential compression. The bearing shown in FIGURES 1 and 2 includes a semi-cylindrical sleeve or journal portion 30 provided with bearing material 32 bonded thereto.

The method of producing the bearing shown in FIGURES 1 and 2 is illustrated in FIGURES 3–7. The material from which the bearing is made is preferably in the form of a strip 36 formed of suitable material such for example as steel provided with a coating of bearing material such for example as aluminum, copper-lead, or the like. Conveniently, this strip material is advanced through a progressive die set for performance of the required operations. Bearing material is removed from an annular zone 38 which occupies the junction between the cylindrical journal portion and the flat thrust bearing portion designated 26 in FIGURE 2. As best seen in FIGURES 4A and 4B, the strip 36 provided with the bearing material here indicated as 42, has the zone 38 of FIGURE 3 somewhat differently formed. In FIGURE 4A the zone is of generally V-shaped cross-section as indicated at 38a, while in the form of the invention illustrated in FIGURE 4B, the zone has a generally U-shaped cross-section as indicated at 38b.

The strip material is advanced in a step by step relation through the progressive die. At a first station the strip is subjected to a punching and cutting operation to provide the material as illustrated in FIGURE 3. At this point substantially semi-circular cuts 44 are taken which are discontinuous at diametrically opposite pairs of hold-on points indicated at 46 and 48. These cuts provide for the generally radially inward movement of the material of the bearing flange as the cup portion is formed in a subsequent operation, while at the same time the material which is to become the bearing is retained in proper location on the advancing strip.

Referring now to FIGURE 7 there is more or less diagrammatically illustrated the draw station of the progressive die. At this station the press base 50 includes a cylinder 52 in which the piston 54 is vertically movable. Secured to the base is a lower die shoe 56 carrying a die plug 58. A draw pad 60 having a central opening receiving the die plug 58 is mounted for vertical movement relative to the lower die shoe 56 and is adapted to be moved upwardly by draw pins 62 actuated by the piston 54.

The ram 64 carries an upper die shoe 66 and an annular die 68 shaped to cooperate with the die plug 58 and the draw pad to form the partially severed material of the strip into the cup shape indicated at 70.

At this time the cup 70 remains attached to the strip 36 by means of the hold-ons 46 and 48, and when separated from the die plug 58 may be advanced to the next station.

While FIGURES 3 and 5 indicate pairs of hold-ons 46 and 48 located 90° from each other, it will be appreciated that if the strip 36 is only slightly wider than the outside diameter of the flange of the bearing, the hold-ons illustrated at 46 may be omitted and the material at the edge of the strip will deform inwardly as the metal is drawn into cup formation.

The draw operation performed as indicated in FIGURE 7, allows design of a bearing having a flange portion 26 of any required size. The material which constitutes the radial flange of the finished bearing is initially provided in the plane which it ultimately occupies so that it is not subjected to the circumferentially acting tensile stresses inherent in the prior production method which involves bending the channel-shaped structure into arcuate configuration. On the contrary, the drawing of the cup centrally of the partially struck out portion of the strip actually draws the metal of the flange portion thereof toward the cup with a resultant establishment of circumferentially acting compressive stresses. Accordingly, thinning, edge tearing, cracking, or other damage to the bearing material is avoided.

Following the draw operation the strip with the partially severed cupped bearing portion is advanced to the next station where the radial flange of the bearing portion is struck in a coining press. This operation is suggested in FIGURES 5 and 6 where parting line relief grooves 72 are coined into the thrust bearing surface of the flange portion. In addition, other formations may be provided such as oil grooves, thumbnail grooves 74, which may include Michell grooves 75, and the like. This operation of course also flattens and dimensions the flange portion of the bearing. At the same or at additional stations the bottom of the cup is blanked out and the flange O.D. is preferably trimmed to finished size.

Thereafter, the flanged cup is severed as for example by sawing or shearing along the parting line located centrally of the relief groove 72.

The bearing halves after assembly are preferably coined in an operation illustrated in FIGURE 8. In this figure a coining block 80 is provided having a semi-cylindrical recess 82 adapted to receive the semi-cylindrical journal bearing portion 30 of the semi-cylindrical flanged bearing. The upper coining block 84 having a substantially semi-cylindrical pad 86 is moved downwardly on a ram and is provided with coining shoulders 88 engageable with the axially extending parting edges 90 of the journal portion 30 of the bearing 24. By appropriate dimensioning of the coining apparatus, the bearing may be upset so as to produce an exactly sized bearing having the requisite crush height in excess of the normal 180° angular extent.

It will of course be apparent that the parting line relief groove 72 prevents one edge of the thrust bearing portion from projecting outwardly beyond the adjacent edge of the companion bearing portion when the two are assembled together with the thrust flange bearing portions facing in the same direction.

Finally, the bearings are completed as usual by circle grooving, punching, oil grooves, broaching, etc.

Referring now to FIGURES 10 and 11 there are shown two alternative manners of employing the finished bearings.

In the first place, it may be mentioned that a limitation previously imposed on bearing design was due to the inability to produce the thrust bearing of adequate size. In the prior art, as illustrated in FIGURE 9, it was necessary to employ two mating bearing halves so that the total area of the flanges 16 provided adequate bearing area. In accordance with the present invention the radial flange of the bearing may be of any required dimension and hence, it is found that thrust may be adequately opposed by the area of a single bearing half. Thus, in FIGURE 10 the bearings 24 are assembled with the flange portions 26 thereof facing in opposite directions. This is of particular advantage over the prior art arrangement illustrated in FIGURE 9, which requires maintenance of highly accurate spacing between the confronting surfaces of the flanges at opposite ends of each bearing half. With the present construction, since each bearing is provided with a thrust bearing at only one end thereof, this problem does not arise.

The arrangement in FIGURE 10 is of course effective to provide a shaft bearing by the coaction of the cylindrical portions 30 as well as the two opposed thrust bearings provided by the flange portions 26.

Alternatively, if thrust is present in a single direction, the bearings 24 may be assembled as illustrated in FIGURE 11 where the flange portions 26 thereof face in the same direction. In this case, severance of the flanged cupped product along the parting line groove, as previously described, prevents edge interference with the surface engaging the thrust bearing formed by the two flanges 26.

Finally, the bearing assembly may be provided as illustrated in FIGURE 12 in which the flanged upper half shell 24 is provided with the flange portion 26 on the main thrust side only. The lower half-bearing is unflanged.

A most important advantage of the present invention results in the nature of the stresses applied to the material. Since the bimetal material (bearing coated backing metal) is subject to compressive stresses, at least near the outside of the flange portion, scrap is eliminated since cracking of the bearing and/or other damage to the bearing material is not a problem.

Flange height or usable thrust area can be greatly increased since the bearing design is not limited by the requirement of staying within the elongation limits of steel backing in the production of the flange.

A further important advantage is in the elimination of the requirement of maintaining a critical bearing gauge size between confronting flange surfaces at opposite ends of the bearing as is now required. With the present invention, as described above, this is avoided since each bearing element is provided with a radial flange portion at only one end thereof.

Production of prior art bearings of the type illustrated in FIGURE 9 requires the machining of angular reliefs on the flange ends. This is of course eliminated for most usage by the present invention, since in the bearing assembly a single thrust flange is provided at each end of the bearing assembly.

Flange face relief is coined on the thrust face on the parting line, thus eliminating a further usual subsequent machine operation. The flange-to-body undercut is preferably coined or otherwise machined on the strip in the flat, as illustrated in FIGURES 4A and 4B.

It may be further noted that while the present bearing assembly as illustrated in FIGURE 10, provides only a half thrust bearing at each side of the assembly, this often was the practical result of the prior art assembly illustrated in FIGURE 9. Thus, where one bearing flange was somewhat thicker than the other, it assumed the entire thrust load. In any case, it has been found that the provision of a generally 180° segmental thrust bearing of adequate size, in accordance with the present invention, is fully equivalent to the use of a 360° thrust bearing of commensurate size. Furthermore, with the present invention it is possible to provide more area in a 180° segmental thrust bearing than was possible in the complete 360° thrust bearing of the prior art, if this is required.

The drawings and the foregoing specification constitute a description of the improved flanged bearing, in such full, clear, concise and exact terms as to enable any person skilled in the art to practice the invention, the scope of which is indicated by the appended claim.

What I claim as my invention is:

A bearing assembly comprising a pair of substantially semi-cylindrical journal bearing portions assembled together to form a cylindrical journal bearing, one of said journal bearing portions having at one end only thereof a flat radially extending flange portion constituting a segmental thrust bearing, and the other of said journal bearing portions having at the end thereof remote from said flange portion a flat radially extending flange portion constituting a segmental thrust bearing facing in the opposite direction from the other thrust bearing, said flange portions each having an area sufficient to constitute an effective thrust bearing.

References Cited by the Examiner
UNITED STATES PATENTS

| | | | |
|---|---|---|---|
| 624,047 | 5/1899 | Keiper | 113—117 |
| 1,275,371 | 8/1918 | Bingham | 113—117 X |
| 1,300,507 | 4/1919 | Starker | 308—237 X |
| 1,653,528 | 12/1927 | Yeager | 308—167 |
| 1,751,780 | 3/1930 | Weiger | 308—237 X |
| 1,859,608 | 5/1932 | Vigne | 308—237 |
| 2,208,664 | 7/1940 | Costello | 308—37 |
| 2,821,444 | 1/1958 | Brown | 308—23 |

DAVID J. WILLIAMOWSKY, *Primary Examiner.*

ROBERT C. RIORDON, DON A. WAITE, *Examiners.*

L. L. JOHNSON, *Assistant Examiner.*